കരുത്>

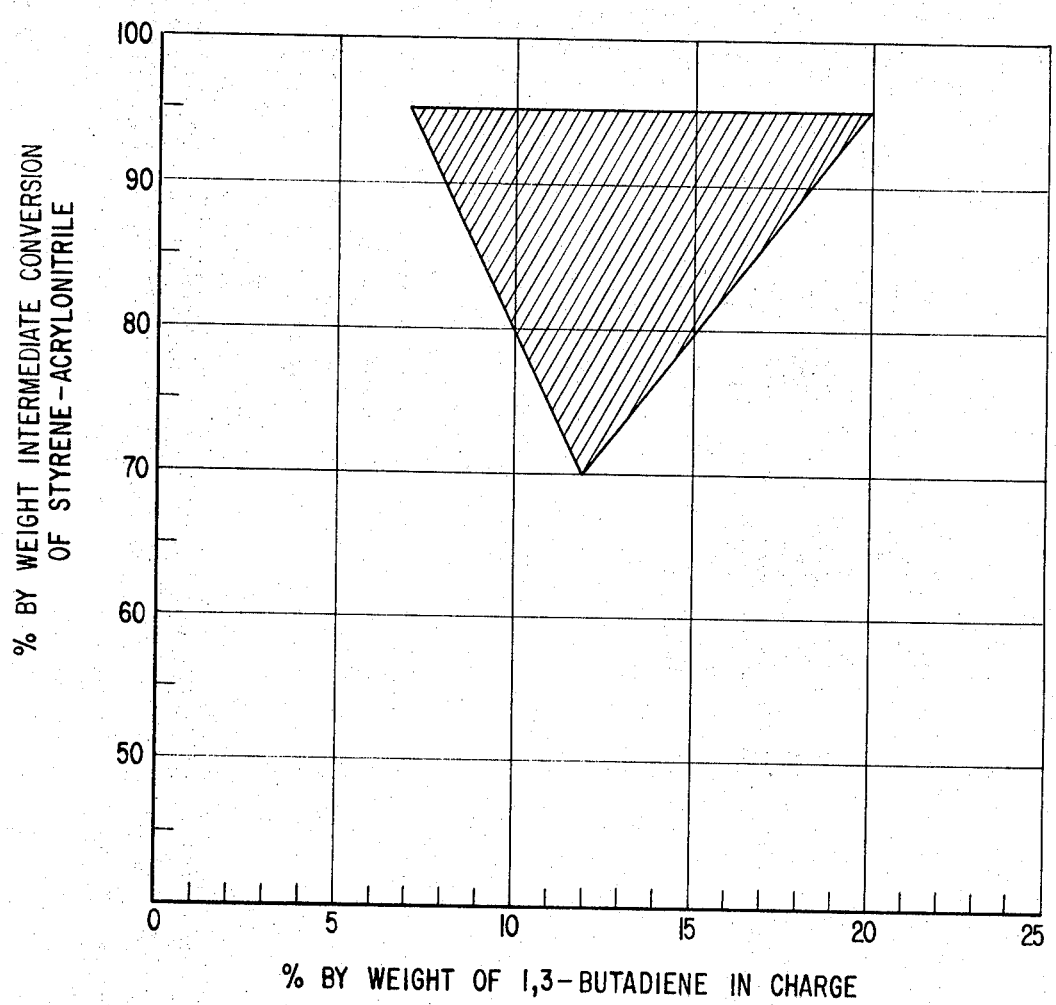

United States Patent Office 3,538,194
Patented Nov. 3, 1970

3,538,194
PREPARATION OF RUBBER MODIFIED PLASTICS
Robert E. Barrett, Baton Rouge, and Lawrence J. Regira, Donaldsonville, La., assignors to Copolymer Rubber & Chemical Corporation, a corporation of Louisiana
Filed Mar. 20, 1967, Ser. No. 624,324
Int. Cl. C08f *19/08, 19/18*
U.S. Cl. 260—879      10 Claims

ABSTRACT OF THE DISCLOSURE

Improved rubber modified plastics are prepared by a novel polymerization process in which an alkenyl aromatic monomer such as styrene and an acrylic monomer such as acrylonitrile are copolymerized in the presence of a free radical catalyst until 70–95% by weight of the monomers are converted to polymer, thereafter 7–20% by weight of a conjugated polyunsaturated monomer such as butadiene is added to the reaction mixture while it contains live catalyst, and the polymerization is continued.

---

This invention relates to the preparation of rubber modified plastics by a novel emulsion polymerization process.

A wide variety of processes have been proposed heretofore for the preparation of rubber modified plastics. The most commonly used commercial process involves a number of steps in different reaction and treating vessels including preparing a hard and durable styrene-acrylonitrile resin which is brittle and has low impact resistance, preparing in another reaction vessel a highly unsaturated elastomer such as polybutadiene which is capable of absorbing shock, thereafter improving the compatibility of the elastomer with the styrene-acrylonitrile resin by grafting monomeric styrene and acrylonitrile thereon, and then blending the styrene-acrylonitrile resin with the grafted elastomer in proportions to arrive at a product which has useful properties. Often the prior art procedures failed to produce a rubber modified plastic which has optimum properties in all respects, including impact resistance, tensile strength and hardness.

A simplified emulsion polymerization process for the preparation of improved rubber modified plastics which could be carried out in a single reaction vessel would be highly desirable, and would result in substantial economic advantages. However, such a process was not available prior to the present invention.

It is an object of the present invention to provide a novel emulsion polymerization process for the preparation of improved rubber modified plastics.

It is still a further object to provide the improved rubber modified plastics prepared in accordance with the process of the invention.

Still other objects and advantages of the invention will be apparent to those skilled in the art upon reference to the following detailed description, the example and the drawing, which graphically illustrates the manner in which the intermediate conversion of styrene and acrylonitrile in the first polymerization stage and the amount of butadiene in the second polymerization stage are correlated when preparing improved rubber modified plastics in accordance with the invention.

In accordance with the present invention, it is essential that the monomeric mixture of at least one alkenyl aromatic monomer and at least one acrylic monomer be interpolymerized in an emulsion polymerization process in the presence of an emulsifying agent and a free radical catalyst until 70–95% by weight and preferably 75–90% by weight, of the monomers initially present are converted to a polymer. Thereafter, 7–20% by weight and preferably 10–15% by weight, of at least one conjugated polyunsaturated monomer, based on the total weight of all monomers charged to the system for interpolymerization, is added to the above reaction mixture while it still contains live catalyst, and at least some of the polymer chains have active polymerization sites thereon, and the interpolymerization is continued until the desired percent conversion of all monomers to polymers is reached. The final weight percent conversion of all monomers to polymer may be in accordance with the prior art, but usually a final conversion of 90–100% by weight, and preferably 95–100% by weight, of the total monomer is desirable.

Examples of alkenyl aromatic monomers include alkenyl aromatic hydrocarbons containing 8–20 carbon atoms and their halogenated derivatives such as styrene, alpha-alkyl styrenes wherein the alkyl groups contains 1–8 carbon atoms such as alpha-methyl styrene, alpha-chlorostyrene, vinyl naphthalene, alkyl substituted vinyl naphthalene, wherein the alkyl groups contain 1–8 carbon atoms, and halogen-substituted vinyl naphthalene. In most instances styrene is preferred.

The acrylic monomers for use in practicing the invention have the general formula

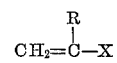

wherein R is selected from the group consisting of hydrogen and alkyl groups having 1–5 carbon atoms, and X is selected from the group consisting of

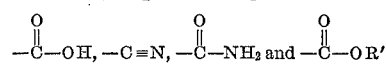

wherein R' is an alkyl group containing 1–5 carbon atoms. Examples of specific acrylic monomers include acrylonitrile, acrylamide, methyl or ethyl acrylonitrile, and acrylic, methacrylic and ethacrylic acids and the methyl, ethyl, propyl and isopropyl esters thereof. Acrylonitrile is usually preferred.

Examples of conjugated polyunsaturated monomers include polyenes containing 4–10 carbon atoms and at least one pair of conjugated ethylenic double bonds, and the halogenated derivatives thereof. pecific examples include 1,3-butadiene, isoprene, piperylene, 1,3-dimethylbutadiene, and chloroprene. Butadiene is usually preferred.

The alkenyl aromatic monomer and the acrylic monomer are present in a ratio by weight between about 2:1 and 4:1, and preferably about 3:1. The conjugated polyunsaturated monomer is present in an amount to provide 7–20 parts by weight, based upon the total weight of the alkenyl aromatic monomer, the acrylic monomer, and the conjugated polyunsaturated monomer.

A wide variety of free radical polymerization catalysts may be employed. Examples of free radical polymerization catalysts include inorganic persulfates such as ammonium, sodium or potassium persulfate, and organic peroxides such as benzoyl peroxide, lauroyl peroxide, propinoyl peroxide and 2-4-dichlorobenzoyl peroxide, and 2,2'-azobis (2-methylpropinonitrile).

A redox recipe composed of hydroperoxides such as paramenthane hydroperoxide, diisopropylbenzene hydroperoxide, and a reducing agent such as sodium formaldehyde sulfoxylate and ferrous sulfate also may be used. The free radical catalyst may be used in the same amount that is employed in the prior art, e.g., about 0.01–1 part by weight for each 100 parts by weight of monomers.

The polymerization is carried out in aqueous emulsion. Examples of suitable emulsifying agents include the long chain fatty acid sodium, potassium and ammonium soaps such as those containing 10–25 carbon atoms, and preferably 16–18 carbon atoms, the sodium, potassium and ammonium rosin acid or rosin acid derived soaps, and synthetic detergents such as the sodium, potassium or ammonium alkyl aryl sulfonates, and especially the alkyl benzene sulfonates. The emulsifying agent is used in the same amount as in the prior art, e.g., about 1–5 parts by weight for each 100 parts by weight of monomers.

The reaction mixture also contains a prior art modifier which may be a mercaptan such as tertiary dodecyl mercaptan. Other suitable chain transfer agents may be employed when desired, such as straight chain, secondary and tertiary mercaptans having 9–16 carbon atoms, and mixtures thereof.

The initial partial polymerization of the alkenyl aromatic monomer and the acrylic monomer may be carried out at the usual polymerization temperatures employed in the prior art processes, such as at a temperature of about 40–80° C., preferably, the temperature should be about 40–45° C. up to 70% conversion and about 60–80° C. thereafter. The first polymerization stage is carried out until the desired intermediate percent conversion of the alkenyl aromatic monomer and the acrylic monomer to polymer is obtained. The reaction mixture contains the polymer of these monomers, and free alkenyl aromatic monomer and acrylic monomer. A substantial percentage of the polymeric chains have active polymerization sites and unused catalyst remains in the system. It is not necessary to add additional catalyst along with the conjugated polyunsaturated compound.

Although the final reaction products have compositions which have not been fully characterized, the products may include:

(1) Styrene-acrylonitrile copolymer to which butadiene monomer has been grafted at sites along the polymer chain;

(2) Styrene-acrylonitrile copolymer on which butadiene monomer has been block polymerized on the terminal portions of the polymer chains;

(3) Styrene-acrylonitrile-butadiene interpolymer;

(4) Styrene-acrylonitrile copolymer;

(5) Butadiene-acrylonitrile copolymer;

(6) Butadiene-styrene copolymer;

(7) Polybutadiene on which has been grafted butadiene and/or styrene monomer at sites along the polymer chains;

(8) Polybutadiene;

(9) Polystyrene; and

(10) Polyacrylonitrile.

The resulting emulsion or latex of the rubber modified plastic may be further processed in accordance with prior art practices. For instance, after stripping off unreacted monomers, if present, and addition of an antioxidant, the polymer may be precipitated by addition of a creaming agent, if needed, and an acidic coagulant. The creaming agent may be sodium chloride solution, and the acidic coagulant may be acetic acid or a dilute mineral acid such as hydrochloric or sulfuric acid. Other methods of precipitation may be employed including addition of hot aqueous calcium chloride. The precipitated resin is dewatered and filtered, washed in water to remove water soluble salts and other impurities, and dried in a prior art oven, such as for 24 hours at 50° C. Fluidized bed drying at 50–100° C. for one hour is also satisfactory. The dried resin may be pelletized or formed into other desired shapes suitable for marketing.

Prior art antioxidants and other compounding ingredients and aids may be added. Examples of suitable antioxidants include phosphited polyalkyl polyphenols and tri (mixed mononoyl-dinonyl) phenyl phosphite. When desired, coloring agents may be added to produce colored resins. The coloring pigments and processing steps of the prior art are suitable for this purpose.

With reference to the graph appearing in the drawing, it is essential in order to produce a commercially acceptable polymer that the amount of the conjugated polyunsaturated monomer and the percent intermediate conversion be correlated to fall within the shaded triangular area. In instances where the percent intermediate conversion and/or the percent of polyunsaturated monomer fall outside of the triangle, then a polymer with inferior properties is produced. This is shown in greater detail by the data and the discussion which appear in the specific example.

The foregoing detailed description and the following specific example are for purposes of illustration only, and are not intended as being limiting to the spirit or scope of the appended claims.

EXAMPLE

Several series of bottle emulsion polymerizations of acrylonitrile, styrene and butadiene were run at varying acrylonitrile and styrene intermediate conversions and butadiene charge levels. The butadiene charge levels were varied between 5 and 25 parts by weight, based upon the total weight of monomeric material initially charged and added to the system.

Prior to charging, 28 ounce pop bottles were washed with tap water and detergent to remove foreign matter. The washed bottles were charged with:

(1) An emulsifying agent which was sodium stearate in the form of a 10% aqueous solution, in an amount to provide 3.0 parts by weight per 100 parts by weight of monomers on a dry solids basis;

(2) Potassium persulfate as a 5% aqueous solution in an amount to provide 0.1 part by weight per 100 parts by weight of monomers on a dry solids basis; and (3) Water adjusted to provide a total of 200 parts by weight per 100 parts by weight of monomers.

The pH of the resulting aqueous mixture was 10.0–10.5.

Thereafter, styrene and acrylonitrile monomers were added in a 3:1 ratio respectively and in quantities so that the total, when added to the butadiene charge, equaled 100 parts by weight. A modifier, which was tertiary dodecyl mercaptan in an amount of 0.3 part by weight, was charged and the bottles were purged with nitrogen for five minutes. Thereafter, the bottles were immediately capped and a 1% by weight aqueous solution of sodium hydrosulfite in an amount of 0.01 part by weight on a dry solids basis was added by syringe as an oxygen scavenger.

The charged bottles were placed in a laboratory scale bottle polymerizer and rotated through a constant temperature water bath which was maintained at 42° C. When the monomers had been converted to the percent by weight intermediate conversion indicated in the following table, the bottles were removed, and 1,3-butadiene was added by syringe. In instances where the intermediate conversion of the initial two monomers was to be above 70% by weight, the bottles were transferred at 70% conversion to a 70° C. laboratory scale bottle polymerizer for the additional polymerization.

The butadiene monomer was charged in an amount varying between 5 and 25 parts by weight of the total monomers immediately after cooling of the bottles to below 30° C. The bottles were then placed in a laboratory scale bottle polymerizer which was maintained at a temperature of 70° C., and the polymerization was continued to a maximum conversion between 90% and 100%, at which time a shortstop solution containing diethylhydroxylamine in an amount of 0.02 part by weight on a dry solids basis was added.

The resultant resinous latex was vacuum distilled to remove the last traces of unreacted monomers. The resin was protected by the addition of 2.0 parts by weight of an 18% aqueous emulsion of antioxidant (Agerite Geltrol) before recovery. Thereafter, the latex was creamed with brine solution, coagulated by addition of acetic acid in an amount to provide a pH of 3.0, and the solid resin was filtered, washed with water, and dried in a draft oven at 50° C. for 24 hours.

The dried resinous powder was melt mixed in a Brabender Plasticorder for 3 minutes at 200° C. to improve the homogeneity, and the samples were tested following prior art test procedures. Impact resistance was determined by ASTM Test No. D-256-56, Method A, for Izod impact resistance. The 1/8-inch compression molded samples were preconditioned in accordance with Method D-6-618-61, Condition A. Test specimens were machined from the molded material as required by these tests. Hardness was measured following the procedure set out in ASTM Test No. D-785-65, Procedure A for Rockwell hardness. The "R" Rockwell scale was used and the 1/8-inch compression molded samples received the same preconditioning treatment as the Izod test spcimens mentioned above. The data thus obtained are recorded below in Table I.

TABLE I

| Sample Number | Percent by weight intermediate styrene-acrylonitrile conversion | Percent by weight charged 1,3-butadiene | Rockwell hardness "R" scale | Izod impact (foot-pounds/inch of notch) |
|---|---|---|---|---|
| 1 | 68 | 5 | 117 | .23 |
| 2 | 79 | 5 | 117 | .29 |
| 3 | 83 | 5 | 115 | .29 |
| 4 | 91 | 5 | 115 | .34 |
| 5 | 95 | 5 | 117 | .24 |
| 6 | 100 | 5 | 120 | .41 |
| 7 | 62 | 7 | 115 | .45 |
| 8 | 70 | 7 | 109 | .44 |
| 9 | 85 | 7 | 100 | .41 |
| 10 | 90 | 7 | 108 | .56 |
| 11 | 70 | 8 | 114 | .33 |
| 12 | 75 | 8 | 114 | .46 |
| 13 | 95 | 8 | 114 | .98 |
| 14 | 62 | 9 | 116 | .23 |
| 15 | 80 | 9 | 105 | .34 |
| 16 | 66 | 10 | 99 | .36 |
| 17 | 81 | 10 | 97 | 1.16 |
| 18 | 91 | 10 | 107 | .96 |
| 19 | 58 | 12 | 104 | .31 |
| 20 | 71 | 12 | 85 | 1.46 |
| 21 | 85 | 12 | 96 | 5.0 |
| 22 | 93 | 12 | 106 | .80 |
| 23 | 100 | 12 | 112 | .48 |
| 24 | 68 | 14 | 66 | 17.9 |
| 25 | 78 | 14 | 89 | 7.93 |
| 26 | 87 | 14 | 101 | 2.06 |
| 27 | 70 | 15 | 35 | 8.12 |
| 28 | 78 | 15 | 75 | 8.25 |
| 29 | 89 | 15 | 95 | 4.40 |
| 30 | 92 | 15 | 96 | 2.25 |
| 31 | 96 | 15 | 105 | 0.53 |
| 32 | 100 | 15 | 107 | 0.44 |
| 33 | 66 | 17 | 18 | 5.48 |
| 34 | 69 | 17 | 34 | 10.8 |
| 35 | 89 | 17 | 90 | 1.31 |
| 36 | 91 | 17 | 97 | 1.34 |
| 37 | 65 | 19 | 0 | 7.84 |
| 38 | 92 | 19 | 85 | 2.14 |
| 39 | 93 | 19 | 93 | 1.62 |
| 40 | 91 | 20 | 98 | .48 |
| 41 | 95 | 25 | 91 | .47 |
| 42 | 100 | 25 | 94 | .44 |

The data appearing in Table I were used in preparing the graph illustrated in the accompanying drawing.

Upon reference to the above data and the graph, the shaded triangular area graphically illustrates the conditions which are necessary to produce commercially useful plastics, i.e., polymers having an Izod text value above 0.8 foot pound per inch of notch and a Rockwell hardness above 85 on the "R" scale. It may be seen that commercially useful polymers are produced only within certain narrow, carefully controlled limits, i.e., in the triangular area defined on one side by the 95% intermediate conversion line, on a second side by a line drawn between the point representing 7% butadiene addition at 95% intermediate conversion and the point representing 12% butadiene addition at 70% intermediate conversion, and on a third side by a line drawn between the point representing 20% butadiene addition at 95% intermediate conversion and the point representing 12% butadiene addition at 70% intermediate conversion. Polymers produced under conditions outside of the triangular area have poor physical properties and are not considered to be satisfactory for commercial production.

What is claimed is:

1. A process for preparing an interpolymer comprising interpolymerizing a monomeric mixture consisting essentially of an alkenyl aromatic monomer and an acrylic monomer in aqueous emulsion in the presence of an emulsifying agent and a free radical polymerization catalyst in catalytic amounts, the monomeric mixture containing the alkenyl aromatic monomer and the acrylic monomer in a ratio by weight between about 2:1 and 4:1 and being interpolymerized to an intermediate conversion between 70% and 95% by weight of the monomers initially present, the resulting partially polymerized monomeric mixture containing polymer chains having active polymerization sites thereon, thereafter adding 7–20 percent by weight of a polyunsaturated monomer having conjugated ethylenic double bonds or halogenated derivatives thereof to the partially polymerized monomeric mixture, the amount of the polyunsaturated monomer to be added being based upon the total weight of the acrylic monomer, alkenyl aromatic monomer and the polyunsaturated monomer that is subjected to the interpolymerization, the percent by weight of the intermediate conversion of the mixture of acrylic monomer and alkenyl aromatic monomer and the percent by weight of the added polyunsaturated monomer being correlated so as to fall within the triangular area illustrated in the accompanying drawing, and then interpolymerizing the resulting monomeric mixture in the presence of the polymer chains having the active polymerization sites thereon to produce an interpolymer, the acrylic monomer having the general formula

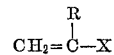

wherein R is selected from the group consisting of hydrogen and alkyl groups having 1–5 carbon atoms, and X is selected from the group consisting of

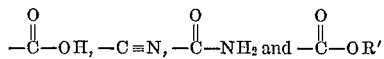

wherein R' is an alkyl group containing 1–5 carbon atoms, the alkenyl aromatic monomer being selected from the group consisting of alkenyl aromatic hydrocarbons having 8–20 carbon atoms and the halogenated derivatives thereof, and the polyunsaturated monomer being selected from the group consisting of polyenes having 4–10 carbon atoms and at least one pair of conjugated ethylenic double bonds and the halogenated derivatives thereof.

2. The process of claim 1 wherein the alkenyl aromatic monomer is styrene.

3. The process of claim 1 wherein the acrylic monomer is acrylonitrile.

4. The process of claim 1 wherein the polyunsaturated monomer is 1,3-butadiene.

5. The process of claim 1 wherein the alkenyl aromatic monomer is styrene, the acrylic monomer is acrylonitrile, and the polyunsaturated monomer is butadiene.

6. The process of claim 5 wherein the ratio by weight of styrene to acrylonitrile is about 3:1.

7. The process of claim 5 wherein about 10–15% by weight of 1,3-butadiene is added to the partially polymerized mixture, the amount of 1,3-butadiene to be added being based upon the total weight of styrene, acrylonitrile and 1,3-butadiene that is subjected to the polymerization.

8. The process of claim 7 wherein the ratio by weight of styrene to acrylonitrile is about 3:1.

9. The process of claim 7 wherein the intermediate conversion of the styrene and acrylonitrile to polymer is between 70% and 90% by weight.

10. The process of claim 9 wherein about 12% by weight of 1,3-butadiene is added to the partially polymerized mixture and the ratio by weight of styrene to acrylonitrile is about 3:1.

References Cited

UNITED STATES PATENTS

| | | | |
|---|---|---|---|
| 2,791,571 | 5/1957 | Wheelock et al. | 260—29.7 |
| 3,081,242 | 3/1963 | Smith et al. | 260—879 XR |

FOREIGN PATENTS 565,897 11/1958 Canada.

JOSEPH L. SCHOFER, Primary Examiner

R. A. GAITHER, Assistant Examiner

U.S. Cl. X.R.

260—80.7, 82.3, 85.5, 88.0, 83.7, 94.2, 88.7, 93.5